(Model.)
L. MILLER.
HARVESTER REEL.
No. 315,649. Patented Apr. 14, 1885.
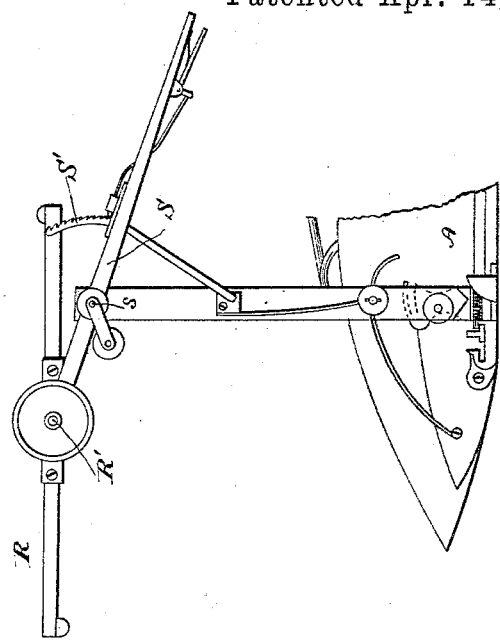
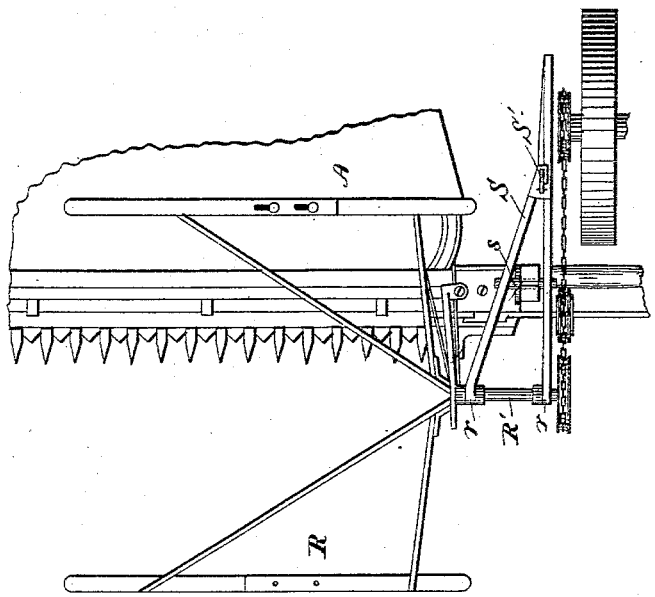
Witnesses:
Chas. R. Burr
A. F. Stewart
Inventor.
Lewis Miller
by Church & Church
His Attorneys

UNITED STATES PATENT OFFICE.

LEWIS MILLER, OF AKRON, OHIO.

HARVESTER-REEL.

SPECIFICATION forming part of Letters Patent No. 315,649, dated April 14, 1885.

Application filed April 5, 1884. (Model.)

*To all whom it may concern:*

Be it known that I, LEWIS MILLER, of Akron, in the county of Summit and State of Ohio, have invented certain new and useful Improvements in Harvester-Reels; and I do hereby declare the following to be a full, clear, and exact description of the same, reference being had to the accompanying drawings, forming a part of this specification, and to the figures and letters of reference marked thereon.

I will first describe my invention, and will then point out its novel features specifically in the claims at the end of this specification.

Referring to the drawings, Figure 1 represents a top plan view of the reel; Fig. 2, a side elevation of the same.

Similar letters of reference in the several figures indicate the same parts.

The letter R indicates the reel, mounted upon and revolving with a shaft, R'. This shaft is elongated considerably more than as heretofore constructed, in order to accommodate two independent bearings, $r\ r$, at such distance apart as to firmly support and brace the shaft and keep it at all times in the line or lines parallel to the plane of the platform A.

The bearings $r\ r$ are mounted upon a bifurcated lever, S, which is supported upon a bolt, $s$, passing transversely through the top of the reel-post and through both branches of the fork-lever. The lever is thus supported upon two bearings at a considerable distance apart, and with the top of the reel-post interposed between its branches, so that in adjusting the reel up and down it cannot be racked or bent to bring the reel out of line with the platform. The lever is adjusted by a curved rack-bar and spring-detent, as shown at S'.

This improved reel-support is equally as light as the old form, and holds the parts much more firmly and rigidly in position.

The machine with which this reel-support is preferably used is shown and described in an application for patent filed by me on the 31st day of December, 1879, and of which the present case is a division.

I claim as my invention—

1. In a harvester, the combination, with the elongated reel-shaft, of the adjustable pivoted bifurcated lever supporting the reel-shaft, as described, and extended back of its pivot to form a handle by which to adjust it, substantially as described.

2. In a harvester, the combination, with the elongated reel-shaft, of the pivoted adjustable bifurcated lever supporting said reel-shaft, as described, and extended back of its pivot to form a handle by which to adjust it, the reel-post interposed between the arms of the lever, and the cross-bolt passing through the arms of the lever and the reel-post and serving as the pivot for the lever, substantially as described.

LEWIS MILLER.

Witnesses:
 FRED. F. CHURCH,
 A. S. STEWART.